J. F. O'CONNOR.
CENTER BEARING FOR CARS.
APPLICATION FILED APR. 14, 1916.
1,249,468.
Patented Dec. 11, 1917.
Fig. 1
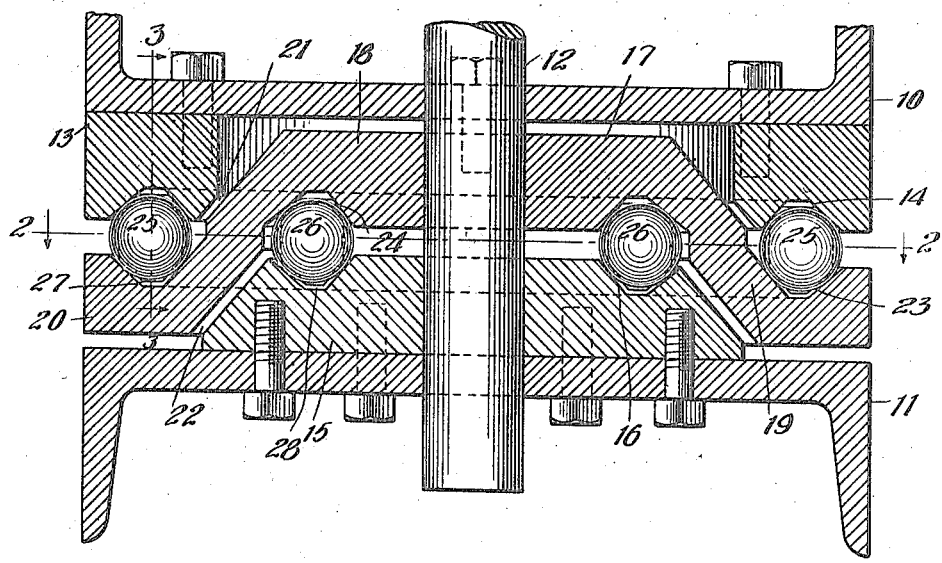
Fig. 2
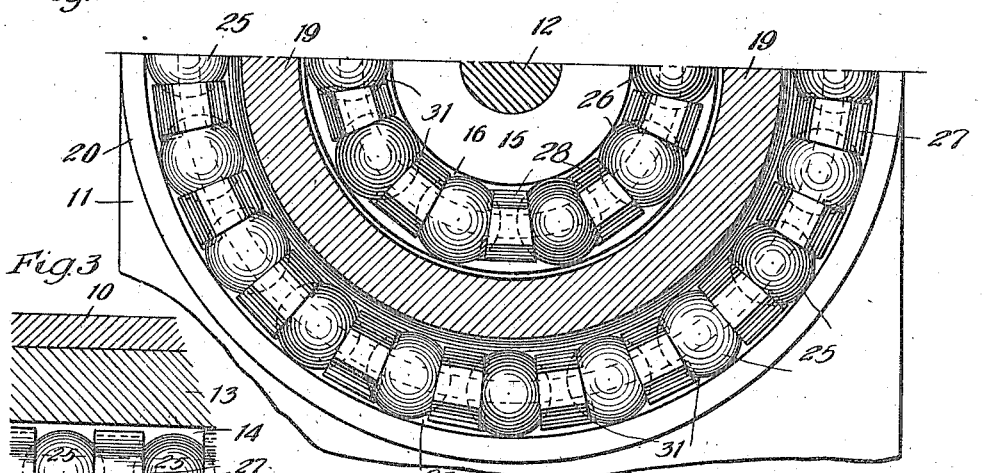
Fig. 3
Fig. 4
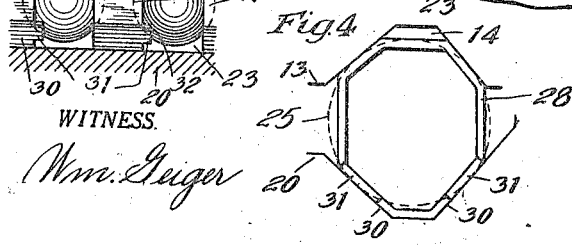
WITNESS.
Wm. Geiger
INVENTOR.
John F. O'Connor
BY
HIS ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

CENTER-BEARING FOR CARS.

1,249,468.  Specification of Letters Patent.  Patented Dec. 11, 1917.

Application filed April 14, 1916. Serial No. 91,206.

*To all whom it may concern:*

Be it known that I, JOHN F. O'CONNOR, a citizen of the United States, residing at Chicago, in the county of Cook and State of Illinois, have invented a certain new and useful Improvement in Center-Bearings for Cars, of which the following is a full, clear, concise, and exact description, reference being had to the accompanying drawings, forming a part of this specification.

This invention relates to improvements in center bearings for cars.

The object of the invention is to provide an anti-friction center bearing for cars which is composed of few parts simply arranged and relatively shallow.

In the drawing forming a part of this specification, Figure 1 is a vertical, longitudinal section of a car taken through the center bearing thereof and illustrating my improvements in connection therewith. Fig. 2 is a horizontal section view of half of the bearing and taken on the line 2—2 of Fig. 1. Fig. 3 is a detail vertical sectional view taken substantially on the line 3—3 of Fig. 1. And Fig. 4 is a detail end elevation illustrating the construction of one of the chocks employed.

In said drawing, 10 denotes the body bolster of a car, 11 the truck bolster and 12 the center pin pivotally connecting the bolsters. Secured to the under side of the body bolster 10 is an annular preferably steel casting 13 having on its under face an annular, flat bottomed, substantially inverted V shape groove 14. Secured to the upper face of the truck bolster 11 is a disk shaped casting 15 having in its upper face an annular groove 16 similar to the groove 14. Interposed between the castings 13 and 15 is a floating plate 17 suitably perforated at the center to accommodate the pin 12, said plate 17 having an upper horizontal portion 18, outwardly and downwardly extending portion 19 and horizontal outer lower rim 20. It will be noted that clearance is provided at 21 and 22 between said plate 17, and the upper casting 13 and lower casting 15, respectively. The floating plate 17 is provided with an annular groove 23 on the upper face of its horizontal rim 20, which groove 23 is in alinement with and corresponds in shape and size to the groove 14. On its under face, the plate 17 is provided with another annular groove 24 which is in alinement with and corresponds in size and shape to the groove 16. An outer series of anti-friction balls 25 travel in the grooves 14 and 23, and an inner series of anti-friction balls 26 travel in the grooves 24 and 16. Associated with the anti-friction balls 25 is a series of chocks 27, see Fig. 2, and with the anti-friction balls 26 is associated another series of chocks 28, said series of chocks 27 and 28 being arranged right and left, that is to permit the anti-friction balls 26 to rotate in a clockwise direction only as viewed in Fig. 2 and to permit the anti-friction balls 25 to rotate in a counterclockwise direction only. As clearly appears from Fig. 4, each of the chocks is of hollow, substantially octagonal form with four of its alternate sides fitting the walls of the grooves within which it travels. The two lower oppositely inclined walls 30—30 of each chock are provided with extensions 31—31 which extend under the corresponding friction ball as clearly indicated in Fig. 3 at 32 so that when one of the anti-friction balls 25 moves to the left as indicated in Fig. 3, it will be jammed or chocked and prevented from rotation. It will be understood that the chocks 27 are similar to the outer series of chocks except that their position is reversed.

From the preceding description, it will be seen that the outer series of anti-friction balls 25 is always constantly shifted in a counterclockwise direction, whereas the inner series of balls 26 are shifted in a clockwise direction. The floating plate 17 will also always be shifted in a clockwise direction. By the construction of the intermediate plates 17 in the manner shown and described, it will be seen that I bring the inner and outer series of anti-friction balls in the same horizontal plane thereby rendering the anti-friction bearing as a whole unusually shallow. At the same time the parts 13, 15 and 17 of the center bearing may be easily and cheaply manufactured in the form of castings.

I claim:

1. In a center bearing for railway cars, the combination with an annular bearing plate having an annular groove in the bottom face thereof, and a second bearing plate of disk form having an annular groove in the upper face thereof, said grooves being substantially concentric and one of the grooves being of greater diameter than the other, of two series of anti-friction members operating in said grooves, a retaining plate interposed between said series of anti-friction members, and two series of chocks associated with said anti-friction members and partly disposed in said grooves.

2. In a center bearing for cars, the combination with two opposed bearing plates, of two series of anti-friction members, one series in engagement with one plate and the other series with the other plate, and a retaining plate interposed between said two series of anti-friction members, said two series of anti-friction members being arranged in the same plane, and right and left series of independently acting individual chocks associated with said series of anti-friction members.

3. In a center bearing for cars, the combination with two opposed bearing plates, of two series of anti-friction members, one series in engagement with one plate and the other series with the other plate, and a retaining plate interposed between said two series of anti-friction members, said two series of anti-friction members being arranged in the same plane, said retaining plate having two annular grooves one on one side and one on the opposite side thereof, and two series of right and left chocks associated with said anti-friction members, one chock for each of said members.

4. In a center bearing for cars, the combination with an upper bearing plate having an annular groove on its lower face, and a lower bearing plate having an annular groove on its upper face, of two series of anti-friction balls located in said grooves, two series of chocks one for each ball also fitting within said grooves and coöperable with said anti-friction balls, one series of chocks being arranged to permit rotation of one series of balls in one direction only and the other series of chocks to permit rotation of the other series of balls in the opposite direction only, and a floating plate interposed between said bearing plates and between said two series of anti-friction balls, said floating plate having annular grooves on opposite sides thereof corresponding respectively with the annular grooves of said bearing plates.

In witness that I claim the foregoing I have hereunto subscribed my name this 17th day of Mar., 1916.

JOHN F. O'CONNOR.

Copies of this patent may be obtained for five cents each, by addressing the "Commissioner of Patents, Washington, D. C."